United States Patent [19]

Chow

[11] 4,216,982
[45] Aug. 12, 1980

[54] SPEED SLIP-ON HOSE COUPLER

[75] Inventor: Ho Chow, River Edge, N.J.

[73] Assignee: Beatrice Foods Co., Moonachie, N.J.

[21] Appl. No.: 973,114

[22] Filed: Dec. 26, 1978

[51] Int. Cl.² ............................................. F16L 37/18
[52] U.S. Cl. ..................................... 285/315; 285/423
[58] Field of Search ................. 285/315, 316, 83, 423; 403/322

[56] References Cited

U.S. PATENT DOCUMENTS

| 3,468,562 | 9/1969 | Chow et al. | 285/423 |
| 3,569,903 | 3/1971 | Brishka | 285/315 X |
| 3,847,393 | 11/1974 | Busselmeier | 285/315 |
| 3,922,011 | 11/1975 | Wolters | 285/315 X |

Primary Examiner—Dave W. Arola
Attorney, Agent, or Firm—James & Franklin

[57] ABSTRACT

A speed slip-on type of hose coupler structured to enable ready coupling and uncoupling of the male and female coupler bodies by way of an interlocking means for the coupler bodies and a releasing device for the interlocking means. The interlocking means comprises a unitary or one-piece locking element having locking portions connected by a resiliently arcuately expansible portion.

10 Claims, 12 Drawing Figures

U.S. Patent  Aug. 12, 1980  Sheet 1 of 3  4,216,982
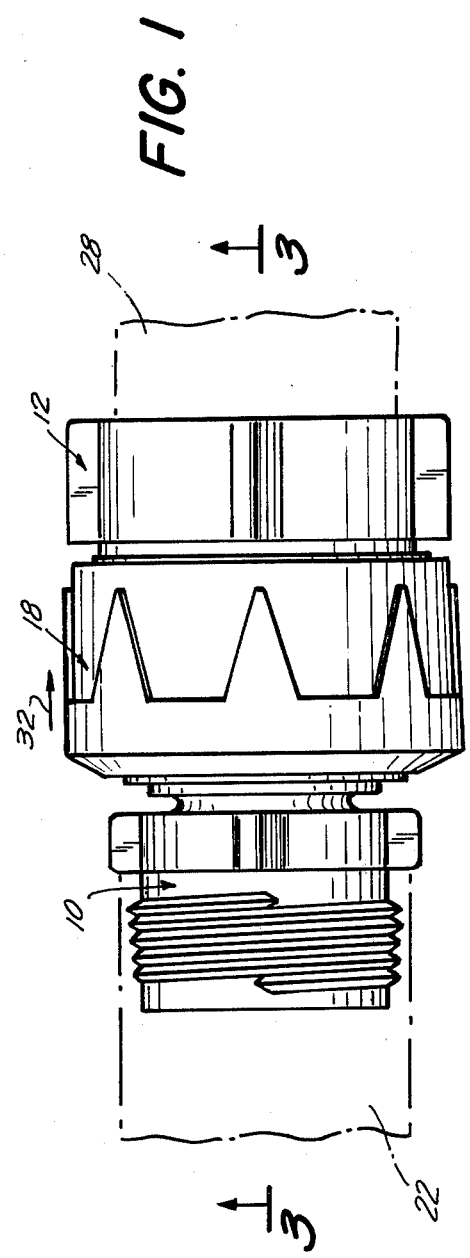
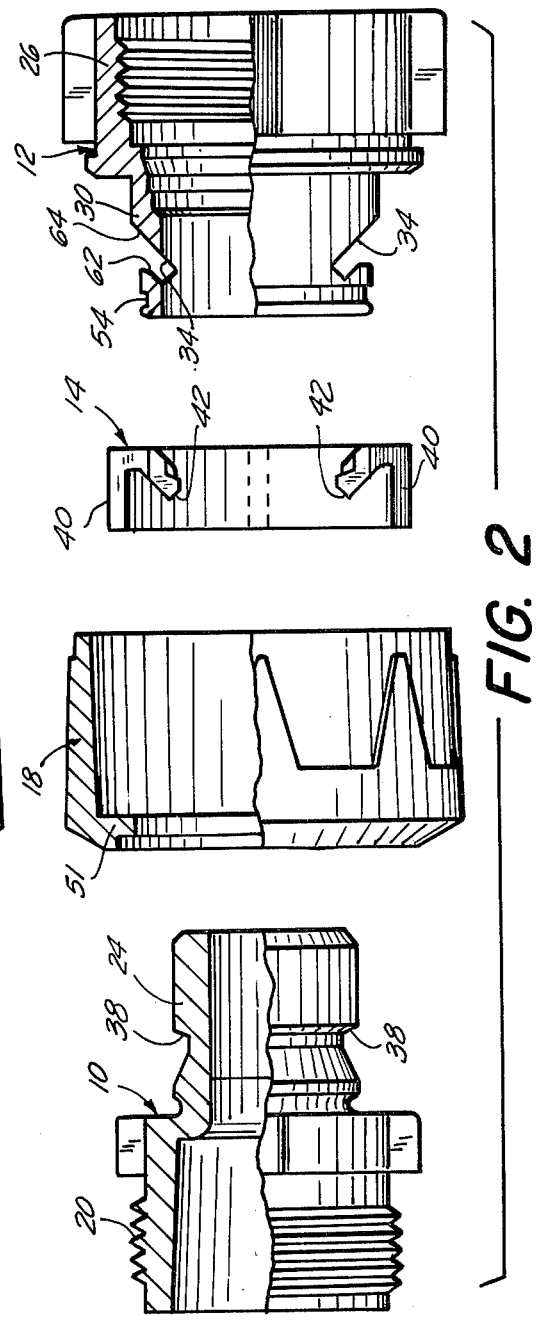

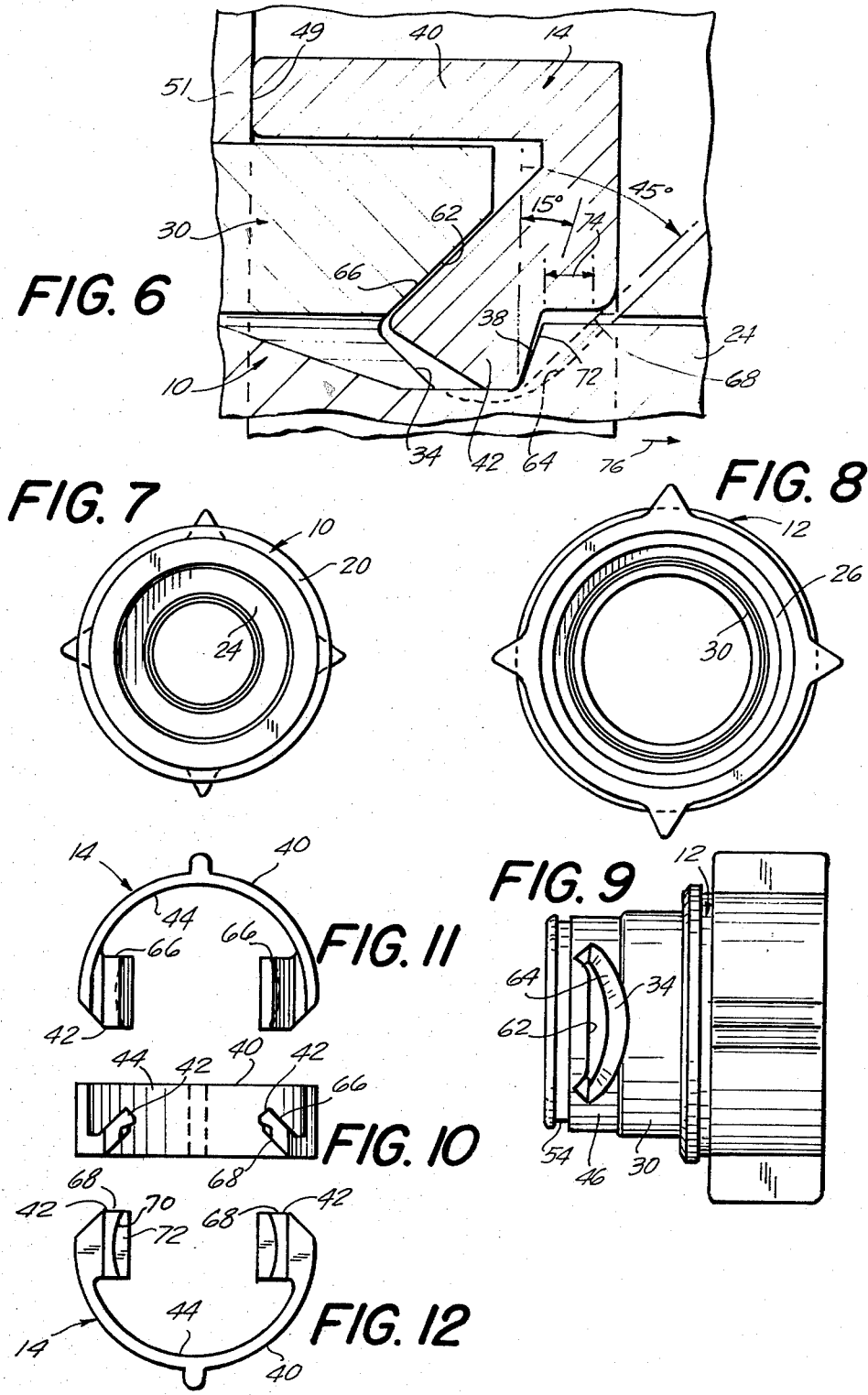

SPEED SLIP-ON HOSE COUPLER

BACKGROUND OF INVENTION

This invention relates to a hose coupler and more particularly to a hose coupler of the type in which the male hose attachable body is speedily attachable to the female hose attachable body by the male body being received by and locked to the female body by the telescoping action of merely pushing the male body into the female body with a plug-in or slip-on fit.

In speed attachable hose couplers of this type the interlocking coupling of the male and female bodies is obtained by telescoping the male body into the female body, and uncoupling or disconnection of the male and female bodies is effected by a releasing device associated with the coupling which when manually operated permits the unplugging of the coupler bodies.

U.S. Pat. No. 3,468,562 discloses an improved speed slip-on or plug-in hose coupler of this type wherein the coupler is simplified to the point where the male body is a one-piece member, the female body is a one-piece member, the releasing device is a one-piece member, and the locking means comprises a pair of locking elements, each a one-piece member, the said members being moreover so associated and assembleable that each of them may be made as a molded plastic element.

More particularly, the aforesaid patent discloses a coupler of this type in which the locking means comprises a pair of locking elements, a washer and a compression spring. The compression spring acts against the washer, which in turn biases the locking elements into their interlocking position. Upon manual actuation sufficient to overcome the spring bias the releasing device forces the locking elements to retreat to a non-interlocking position, the locking elements in turn acting on the washer to compress the spring. While couplers of the type disclosed in the aforesaid patent have proven to be generally satisfactory, the use of such a multi-compenent interlocking mechanism not only increases the cost of manufacturing the coupler (both in terms of the material cost and the assembly cost), but also increases the likelihood of a malfunction of the coupler in use.

Accordingly, it is an object of the present invention to provide a speed slip-on hose coupler of simplified and improved structure.

Another object is to provide such a coupler in which the interlocking means is a unitary or one-piece component, thereby reducing both the cost of manufacturing the unit and the possibility of the unit's malfunction in use.

SUMMARY OF THE INVENTION

The above and related objects of the present invention are obtained in a speed slip-on hose coupler comprising a male hose attachable body, a female attachable body, locking means for interlocking the male and female bodies, and a releasing device mounted on the female body and having a part engageable with the locking means. More particularly, the male hose attachable body is formed with a nipple having a detent, and the female hose attachable body is formed with a sleeve for receiving the nipple with a slip-on fit to a locking position, the sleeve having a wall portion defining a plurality of spaced opending therethrough. The locking means is movable between locking and unlocking positions, and the releasing device is axially slidable on the female body between coupler connecting and disconnecting positions, movement of the releasing device to its coupler connecting position acting to permit the locking means to move to its locking position and reverse movement of the releasing device to its coupler disconnecting position acting on the locking means to move the same to its unlocking position.

The present invention is directed to the improvement in the coupler wherein the locking means not only performs the locking functions of the prior art construction but also inherently provides the biasing means for urging the releasing device and the locking elements to their respective coupler connecting position while permitting the releasing device to be manually forced to its coupler disconnecting position, thereby to move the locking elements to their corresponding disconnecting positions, and at the same time providing a unitary or one-piece construction, thereby eliminating the use of the two separate locking elements in the prior art construction. By having the unitary locking element provide the force for moving the locking elements and the releasing device to their respective coupler connecting positions, the washer and compression spring of the prior art construction are entirely eliminated.

The locking element in the coupler in the instant invention has an arcuate portion disposed at least partially around the sleeve wall portion and a plurality of spaced locking portions disposed along the arcuate portion. The locking element is resiliently arcuately expansible. In its normal relatively unstressed configuration it assumes its locking position, with the locking portions carried thereby extending through the openings of the female body sleeve and engaging the nipple detent of the male body. When the arcuate portion of the locking means is in that unstressed configuration it will be radially contracted, and will cooperate with a cam surface on the coupler body and with the releasing device so as to be cammed to an axial position such that the releasing device is in its coupler connection position. The arcuate portion of the locking element will be arcuately expanded to a stressed configuration when the releasing device is manually moved to its coupler disconnecting position, that resilient expansion of the arcuate portion of the locking element occurring through cooperation between the locking element and the aforementioned cam surface on the coupler body, the arcuate expansion of the locking element causing the locking portions carried thereby to retreat into the openings of the female body sleeve, thereby to disengage themselves from the nipple detent of the male body, permitting the male and female bodies to be separated one from the other. In the preferred embodiment of the present invention the arcuate portion of the locking element, when in its unstressed configuration, is generally semicircular, the locking element carrying two locking portions disposed adjacent opposite ends of the arcuate portion.

Preferably the releasing device comprises a collar extending about the female body and having an inner surface adapted to engage the arcuate portion of the locking element. Reverse movement of the releasing device causes it to force the locking element locking portions to move radially outwardly relative to the axis of the nipple.

The male body, the female body, the locking means and the releasing means each comprise a one piece molded plastic member thereby providing a simplified and improved structure, reducing the cost of manufacturing the unit, and reducing the possibility of the unit malfunctioning in use.

BRIEF DESCRIPTION OF THE DRAWINGS

FIG. 1 is an elevational view of the hose coupler of the invention shown in assembled condition;

FIG. 2 is an exploded or disassembled view of the essential parts thereof with parts shown in section;

FIG. 6 is a fragmentary and enlarged view of parts shown in FIG. 3 explanatory of the action of the interlocking means and action of the coupler;

FIG. 7 is a rear elevational view of the male body of the coupler;

FIG. 8 is a rear elevational view of the female body of the coupler;

FIG. 9 is a plan view of the female body of the coupler;

FIG. 10 is a bottom elevational view, shown to a somewhat enlarged scale, of the locking element of the coupler;

FIG. 11 is a front elevational view of the locking element; and

FIG. 12 is a rear elevational view of the locking element.

DETAILED DESCRIPTION OF THE PREFERRED EMBODIMENTS

Figure 3:
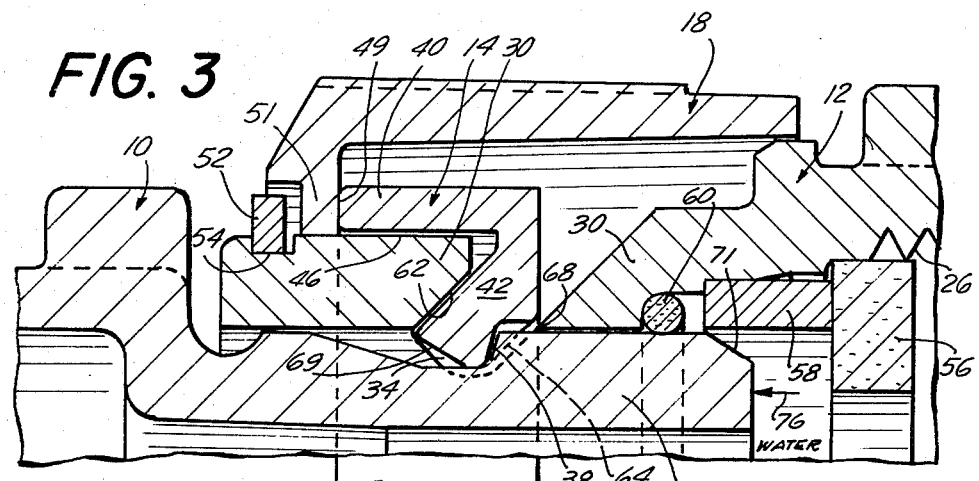
FIG. 3 is a fragmentary elevational view of all of the parts thereof, taken in vertical cross-section in the plane of the line 3—3 of FIG. 1 (parts being broken away) showing the coupler in assembled connected position.

Referring now more in detail to the drawing and having reference first to FIGS. 1 and 2 thereof, which show the main parts of the coupler in assembled and exploded conditions, the hose coupler comprises a male body generally designated as 10, a female body generally designated as 12, locking means generally designated as 14, and a lock releasing device generally designated as 18.

The male body 10 formed integrally with an externally threaded part 20 adapted to be coupled to a hose section 22 (indicated in dot and dash lines) is formed with a nipple 24, and the female body 12 formed integrally with an internally threaded part 26 adapted to be coupled to a hose section 28 (indicated in dot and dash lines) is formed with a sleeve 30 for receiving the nipple 24 with a plug-in or slip-on fit. The releasing device 18 comprises a collar in the form shown mounted on the female body 12 normally assuming the coupler connecting position shown in FIG. 1 of the drawings and axially slidable on the female body 12 in the direction indicated by the arrow 32 (FIG. 1) to a coupler disconnecting position.

The female body 12 further includes a pair of diametrically opposed openings 34 formed in the sleeve 30 thereof, while the male body 10 further includes a detent part 38 formed in the nipple 24 thereof.

The novel locking means for interlocking the male and female bodies as the male body is plugged in or slipped into the female body comprises a unitary or one-piece locking element 14 movable between locking and unlocking portions as hereinafter more fully described. More specifically, the locking element 14 comprises an arcuate portion 40 disposed at least partially about the wall portion of the sleeve 30 and a plurality of spaced locking portions 42 disposed along the arcuate portion 40, these portions 40, 42 being shaped as best shown in FIGS. 10-12. The arcuate portion 40 is resiliently arcuately expansible from a substantially unstressed configuration to a stressed or expanded configuration. In its unstressed configuration (see FIG. 3) the arcuate portion 40 has an internal diameter 44 the same as the external diameter 46 of the portion of the sleeve 30 in which the openings 34 are formed while in its stressed or expanded configuration (see FIG. 4) the arcuate portion 40 has a greater internal diameter 44. The locking element structure is such that the locking portions 42 fit into the openings 34 for movement therein between coupler locking and unlocking positions. In the coupler locking position, the arcuate portion 40 is substantially unstressed so that the locking portions 42 engage the detent part 38 of nipple 24. In the coupler unlocking position, the arcuate portion 40 is arcuately expanded to its stressed configuration so that the locking portions 42 thereby disengage from the nipple detent 38.

Figure 4:
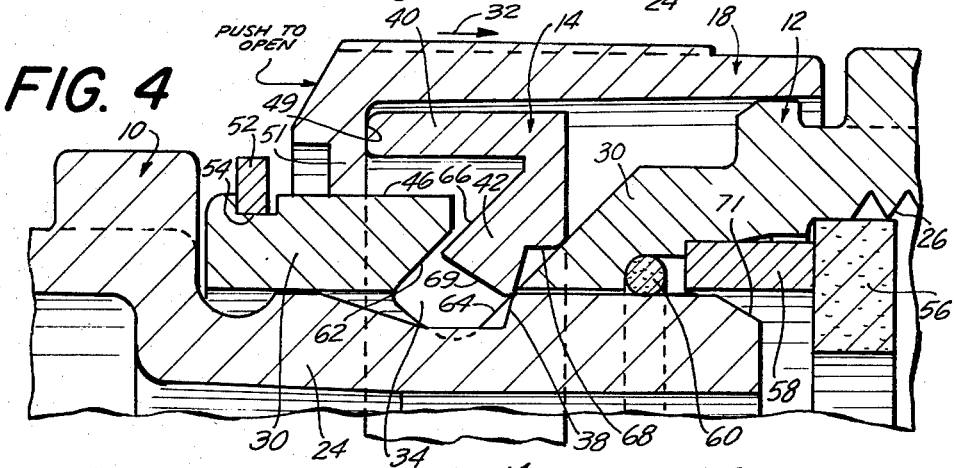
FIG. 4 is a view thereof similar to FIG. 3 and showing the same in a position for effecting the uncoupling or disconnection of the coupler parts.
Figure 5:
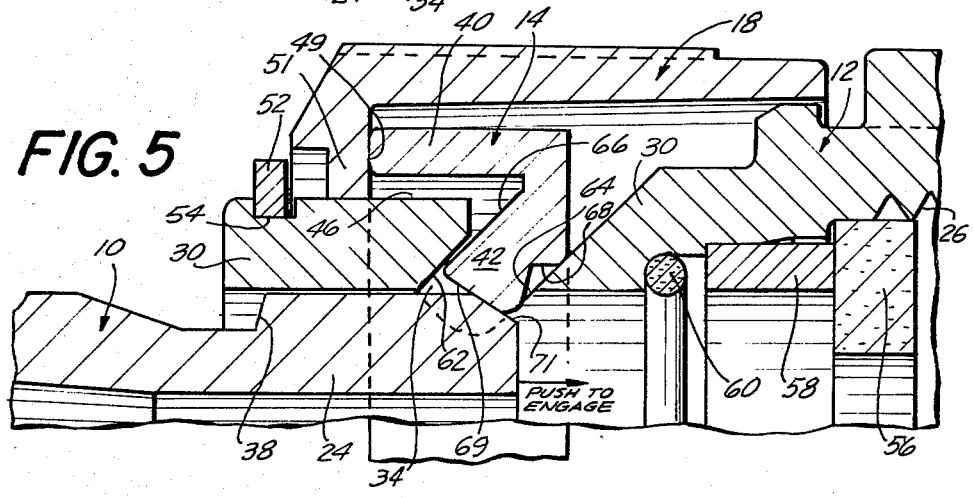
FIG. 5 is a view similar to FIG. 3 and showing the position of the parts during the step of coupling the parts together.

Preferably the arcuate portion 40 is generally semicircular in its unstressed configuration and there are two diametrically opposed locking portions 42, each being disposed adjacent a respective end of the arcuate portion 40 and adapted to fit in a respective one of a pair of diametrically opposed openings 34 in the female body 12. The locking element 14 is mounted on the female body 12 with the arcuate portion 40 disposed about a portion of sleeve 30 and the end portions 42 extending into openings 34, as depicted in FIGS. 3 to 5, one edge of the locking element being engaged at 49 by a flange part 51 formed in the collar 18. To hold the parts in assembled condition there is provided a retaining ring 52 (which also may be made of a plastic) seated in a groove 54 in the front end of the sleeve 30. To complete the assembly the female body 12 is provided with a hose washer 56, a spacer 58 and an O-ring 60.

The locking portions 42 of the locking element 14, the openings 34 in the female body 12 through which these locking portions move, and the detent 38 of the male body 10 are specially configured to carry out the performance and the functions heretofore described. Referring to FIG. 6 where this is best illustrated, the side faces 62 and 64 of the openings 34 and the contiguous surface contacting side faces 66 and 68 of the locking portsions 42 are formed so that they are at a major angle, and preferably at an angle in the range of 45° to a plane normal to the coupler axis as clearly indicated in FIG. 6 of the drawings. Centrally of the face 68 of the locking portion 42, there is a depressed conical area 70 (see also FIGS. 10 and 11) formed with a face 72 which is at a minor angle, and preferably at an angle in the range of 15° to the plane normal to the coupler axis, as is also clearly indicated in FIG. 6 of the drawings, which face 72 has a surface contact with the face of the detent 38 of the male body. A surface contact is also formed at 49, 51 between the locking element 14 and the collar 18. Another surface contact 69, 71 is formed between the bottom of the locking portion 42 and the input end of the nipple 24.

Cooperating with these specially configured parts, the nipple 24 of the male body 10 and the sleeve 30 of the female body 12 are structured so that the sleeve 30 receives the nipple with a slip-on fit to the locking position of the coupler as depicted in FIG. 3 and also a distance beyond the locking position as depicted in FIG. 4, this distance being indicated in FIG. 6 by the double arrow 74. From FIG. 6 it will be seen that movement of the locking element 14 out of the female body opening 34 will, by the cooperation or mating of the interfaces 72 of the locking element and 38 of the male body detent, cause the male body 10 to move in the direction indicated by the arrow 76 a distance beyond the illustrated locking position a distance equal to the distance 74.

With this described structure the following operations depicted in FIGS. 3, 4 and 5 are obtainable:

(1) To couple or connect the coupler bodies, the male body nipple 24 is pushed or plugged into the female body sleeve 30 in the direction shown in FIG. 5. By the interengagement between the face 69 of the locking portions 42 and the face 71 of the input end of the nipple 24, the locking portions 42 are moved radially outwardly along a path at 45° to the plane normal to the coupler axis against bias of the arcuate portion 40, the locking portions 42 then riding on the cylindrical surface of the nipple 24 as the nipple is pushed further into the sleeve until the condition shown in FIG. 3 is reached, at which time the locking portions 42 snap into their locking positions shown in FIG. 3 of the drawings under the bias of the arcuate portion 40. The parts of the coupler are then held in their connected or coupled condition.

(2) To normally disconnect or uncouple the coupler bodies, the releasing collar 18 is manually moved in the direction indicated by the arrow 32 in FIG. 4 of the drawings. The interface engagement 49, 51 between the arcuate portion 40 of the locking element 14 and the flange 51 of the collar 18 when the releasing collar 18 is thus moved, causes the locking element 14 to move from the position shown in FIG. 3 to that shown in FIG. 4. As the collar flange 51 moves the locking element 14 in the direction of arrow 32, the locking portion face 68 cams along the opening face 64 so that the locking portions 42 move partially in the direction of arrow 32 and partially radially outwardly from the axis of the nipple 24, the arcuate portion 40 expanding arcuately as necessary to accommodate a repositioning of the locking portions 42. This action releases or unlocks the male body nipple (as shown in FIG. 4) thereby permitting the male body 10 to be withdrawn and disconnected from the female body 12. This action or operation is free to take place normally in the absence of a water pressure in the coupler.

(3) In the presence of a water pressure in the coupler, the water pressure being active on the male body 10 as indicated by the arrow 76 in FIG. 3, the operation of the releasing collar 18 is effectively resisted thereby effectively preventing the disconnection or the uncoupling of the coupler. This is due to the angular arrangement of the interfaces 72 of the locking portions 42 and 38 of the nipple detent, coupled with the fact that to disconnect or uncouple the parts the nipple has to be moved against the water pressure in the coupler a distance beyound the locking position, namely the distance indicated by the double arrow 74. In opening the coupler by the movement of the collar 18 to move the locking elements from the position shown in FIG. 3 to that shown in FIG. 4, the male body 10 must therefore be moved against the force exerted on itself by the internal water pressure the said distance 74. This action of interference between the locking element and the male body effectively prevents the opening of the coupler while the coupler is under water pressure internally. The effort required to push or move the collar 18 for disconnection or uncoupling of the parts increases as the 15° angle (FIG. 6) decreases. With the 45° and 15° arrangement and the required movement of the male body as described, it is found almost impossible to push or move the collar 18 to uncouple the parts when the internal water pressure is 20 p.s.i. or over.

The locking element 14 is preferably formed of CELCON M90-04 (a trademark employed by Celanese Corporation for its acetal plastic) or DELRIN (a trademark employed by DuPont for its linear polyoxymethylene-type actal resin), although it may also be formed of other plastic providing the requisite resilient arcuate expansibility in the arcuate portion—that is, sufficient resiliency under normal operating conditions to maintain the releasing device 18 in its coupler connecting position and the locking portions 42 extending through the sleeve openings 34 and in contact with the male body detent 38 combined with sufficient arcuate expansibility under manual pressure to enable the releasing device 18 to be moved to its coupled disconnecting position and the locking portions 42 to retreat into openings 34 and be displaced from the male body detent 38. It will be appreciated that while the locking element 14 has been described as having a substantially unstressed configuration and a stressed configuration, the critical element is that the locking element 14 is capable of assuming two different positions, one of which is relatively unstressed and one of which is relatively stressed. While it has been found that the "relatively unstressed" configuration is preferably a substantially unstressed one, the present invention also comprehends a locking element in which the "relatively unstressed" configuration is one in which there is some stress, but significantly less than that in the "stressed configuration."

Thus the present invention provides a speed slip-on hose coupler wherein the means for locking the male and female bodies is of a unitary one-piece construction, thereby reducing manufacturing costs and enhancing reliability of operation. The combination of the two locking elements of the aforementioned patented construction into a single locking element having a resiliently expansible portion thus avoids the need for a separate compression spring and washer or other elements performing the functions thereof.

Now that the preferred embodiments of the present invention have been shown and described in detail, various modifications and improvements thereon will become readily apparent to those skilled in the art. For example, if one is interested in a coupler which is not locked by a fluid pressure (so that disconnection or uncoupling of the male and female bodies can be effected even in the midst of fluid flow therethrough), the minor angle may be reduced far below the recommended 45° and even to 0°. Accordingly, the spirit and scope of the present invention is to be limited only by the appended claims, and not by the foregoing disclosure.

I claim:

1. In a speed slip-on hose coupler comprising:

(A) a male hose attachable body formed with a nipple having a detent;

(B) a female hose attachable body formed with a sleeve for receiving said nipple with a slip-on fit to a locking position, said sleeve having a wall portion defining a plurality of spaced openings therethrough;

(C) locking means for interlocking said male and female bodies, said locking means being movable between locking and unlocking positions; and (D) a releasing device mounted on said female body and having a part engageable with said locking means, said releasing device being axially slidable on said female body between coupler connecting and disconnecting positions, movement of said releasing device to its coupler connecting position acting to permit said locking means to move to its locking position and reverse movement of said releasing device to its coupler disconnection position acting on said locking means to move the same to its unlocking position;

the improvement wherein said locking means comprises a unitary element having an arcuate portion disposed at least partially around said sleeve wall portion and a plurality of spaced locking portions disposed along and in substantially the same plane as said arcuate portions, said arcuate portion being resiliently arcuately expansible from a relatively unstressed configuration to a stressed configuration, said locking element being movable between locking and unlocking positions, said locking element in its locking position having said arcuate portion in its unstressed configuration and said locking portions extending through said openings and engaging said nipple detent and in its unlocking position having said arcuate portion in its stressed configuration and said locking portions disengaged from said nipple detent; said arcuate portion biasing said releasing device to its coupler connecting position and said locking element to its locking position; and said openings being configured and dimensioned so that said reverse movement of said releasing device to its coupler disconnection position displaces said locking element to its unlocking position, without pivoting said locking portions, by causing said locking portions to cam along said sleeve wall portion defining said openings in a movement having a radially outward component relative to the axis of said nipple and thereby causing said arcuate portion to expand radially outwardly and said locking portions to disengage from said nipple detent.

2. The coupler of claim 1 wherein said arcuate portion of said locking element is in its unstressed configuration generally semicircular, and said locking portions of said locking element number two and are disposed adjacent opposite ends of said arcuate portion.

3. The coupler of claim 1 wherein said releasing device comprises a collar extending about said female body and having an inner surface adapted to engage said arcuate portion.

4. The coupler of claim 1 wherein said locking portions of said locking element retreat at least partially into said openings upon movement of said locking element from its locking position to its unlocking position 5. The coupler of claim 1 wherein said reverse movement of said releasing device causes it to force said locking element locking portions to move radially outwardly relative to the axis of said nipple.

6. The coupler of claim 1 wherein said male body is a one-piece member, said female body is a one-piece member, said locking means is a one-piece member and said releasing device is a one-piece member.

7. The coupler of claim 1 wherein said male body, said female body, said locking means and said releasing means each comprises a one-piece molded plastic member.

8. The coupler of claim 1 wherein said sleeve is adapted to receive said nipple to and beyond said locking position and said locking element and said nipple detent are formed with angularly arranged interfaces such that movement of said releasing means in said reverse direction produces an inward movement of said nipple in said sleeve an distance beyond said locking position due to the engagement at said interfaces between said locking element and said nipple detent, which in the presence of a water pressure in the coupler effectively resists such movement to effectively prevent the disconnection of the coupler.

9. The coupler of claim 8 wherein said locking element locking portions are movable in said openings along a path at a major angle to a plane normal to the coupler axis and the interfaces of said nipple detent and said locking element are at a miinor angle to the plane normal to the coupler axis.

10. The coupler of claim 9 wherein said major angle is in the range of 45° and the minor angle is in the range of 15°.

* * * * *